US007166215B2

(12) United States Patent
Reid

(10) Patent No.: US 7,166,215 B2
(45) Date of Patent: *Jan. 23, 2007

(54) PRESSURE VESSEL AND RECYCLABLE FILTER CARTRIDGE

(76) Inventor: Roger P. Reid, 1904 Industrial Way, Caldwell, ID (US) 83605

( * ) Notice: Subject to any disclaimer, the term of this patent is extended or adjusted under 35 U.S.C. 154(b) by 220 days.

This patent is subject to a terminal disclaimer.

(21) Appl. No.: 10/459,385

(22) Filed: Jun. 10, 2003

(65) Prior Publication Data

US 2004/0020837 A1  Feb. 5, 2004

Related U.S. Application Data

(63) Continuation-in-part of application No. 10/110,605, filed on Aug. 2, 2002, now Pat. No. 6,576,129.

(51) Int. Cl.
*B01D 27/08* (2006.01)
*B01D 35/30* (2006.01)

(52) U.S. Cl. .................. 210/232; 210/440; 210/444; 210/450

(58) Field of Classification Search ............. 210/232, 210/440, 444, 450
See application file for complete search history.

(56) References Cited

U.S. PATENT DOCUMENTS

| | | | | |
|---|---|---|---|---|
| 3,684,100 A | 8/1972 | Close | ................. | 210/444 |
| 3,935,106 A | 1/1976 | Lipner | ................. | 210/232 |
| 4,051,036 A | 9/1977 | Conrad et al. | ................. | 210/232 |
| 4,052,307 A | 10/1977 | Humbert, Jr. | ................. | 210/130 |
| 4,082,673 A | 4/1978 | Cilento | ................. | 210/234 |
| 4,133,763 A | 1/1979 | Cooper | ................. | 210/232 |
| 4,349,438 A | 9/1982 | Sims | ................. | 210/180 |
| 4,396,512 A | 8/1983 | Beauman et al. | ................. | 210/668 |
| 4,402,828 A | 9/1983 | Edens | ................. | 210/323.2 |
| 4,504,387 A | 3/1985 | LeMire et al. | ................. | 210/101 |
| 4,529,515 A | 7/1985 | Selz | ................. | 210/234 |
| 4,559,138 A | 12/1985 | Harms, II | ................. | 210/316 |
| 4,588,503 A | 5/1986 | Sugiura | ................. | 210/232 |
| 4,591,438 A | 5/1986 | Tanabe et al. | ................. | 210/282 |
| 4,645,601 A | 2/1987 | Regunathan et al. | ..... | 210/433.2 |
| 4,654,142 A | 3/1987 | Thomsen et al. | ................. | 210/232 |

(Continued)

FOREIGN PATENT DOCUMENTS

EP      0 492 627      7/1992

(Continued)

*Primary Examiner*—Thomas M. Lithgow
(74) *Attorney, Agent, or Firm*—Pedersen & Co., PLLC; Ken J. Pedersen; Barbara S. Pedersen

(57) ABSTRACT

A filter assembly is described that includes a substantially recyclable filter cartridge inside a pressure vessel. The invented filter cartridge comprises substantially non-pressure bearing walls, except for a pressure-bearing neck or cap with neck that is adapted to withstand high pressures preferably in the range of at least 200 psi, and more preferably at least 475 psi from the inside. The walls of the filter cartridge that are incapable of withstanding significant internal pressure are surrounded on the outside by a pressure vessel. The invented cartridge need not seal to the pressure vessel, because the cartridge neck protrudes outside of the pressure vessel to seal directly to a filter head. The cartridge preferably includes a quick-disassembly mechanism for allowing quick and non-destructive access to the internal components and media of the cartridge.

34 Claims, 7 Drawing Sheets

U.S. PATENT DOCUMENTS

| | | | |
|---|---|---|---|
| 4,719,012 A | 1/1988 | Groezinger et al. | 210/232 |
| 4,725,354 A | 2/1988 | Thomsen et al. | 210/232 |
| 4,764,275 A | 8/1988 | Robichaud | 210/232 |
| 4,781,830 A | 11/1988 | Olsen | 210/232 |
| 4,806,240 A | 2/1989 | Giordano et al. | 210/232 |
| 4,857,189 A | 8/1989 | Thomsen et al. | 210/232 |
| 4,904,382 A | 2/1990 | Thomsen | 210/236 |
| 4,915,831 A * | 4/1990 | Taylor | 210/232 |
| 4,956,086 A | 9/1990 | Thomsen et al. | 210/232 |
| 5,013,434 A | 5/1991 | Furrow | 210/232 |
| 5,024,761 A | 6/1991 | Deibel | 210/232 |
| 5,026,478 A | 6/1991 | Tanabe et al. | 210/232 |
| 5,104,537 A | 4/1992 | Stifelman et al. | 210/440 |
| RE34,031 E | 8/1992 | Thomsen et al. | 210/232 |
| RE34,050 E | 9/1992 | Thomsen et al. | 210/232 |
| 5,171,430 A | 12/1992 | Beach et al. | 210/94 |
| 5,254,242 A | 10/1993 | van der Meer et al. | 210/91 |
| 5,256,285 A | 10/1993 | Tomita et al. | 210/445 |
| 5,376,272 A | 12/1994 | Spearman | 210/463 |
| 5,397,468 A | 3/1995 | Chomka et al. | 210/232 |
| 5,643,448 A | 7/1997 | Martin et al. | 210/232 |
| 5,653,871 A | 8/1997 | Thomsen | 210/232 |
| 5,656,159 A | 8/1997 | Spencer et al. | 210/206 |
| 5,685,985 A | 11/1997 | Brown et al. | 210/450 |
| 5,762,789 A | 6/1998 | de los Reyes et al. | 210/321.75 |
| 5,919,362 A | 7/1999 | Barnes et al. | 210/232 |
| 6,322,697 B1 * | 11/2001 | Hacker et al. | 210/248 |
| 6,533,931 B1 * | 3/2003 | Reid | 210/232 |
| 6,576,129 B1 * | 6/2003 | Reid | 210/232 |

FOREIGN PATENT DOCUMENTS

| | | |
|---|---|---|
| EP | 0 526 932 A | 2/1993 |
| WO | WO 96 09875 A | 4/1996 |

* cited by examiner

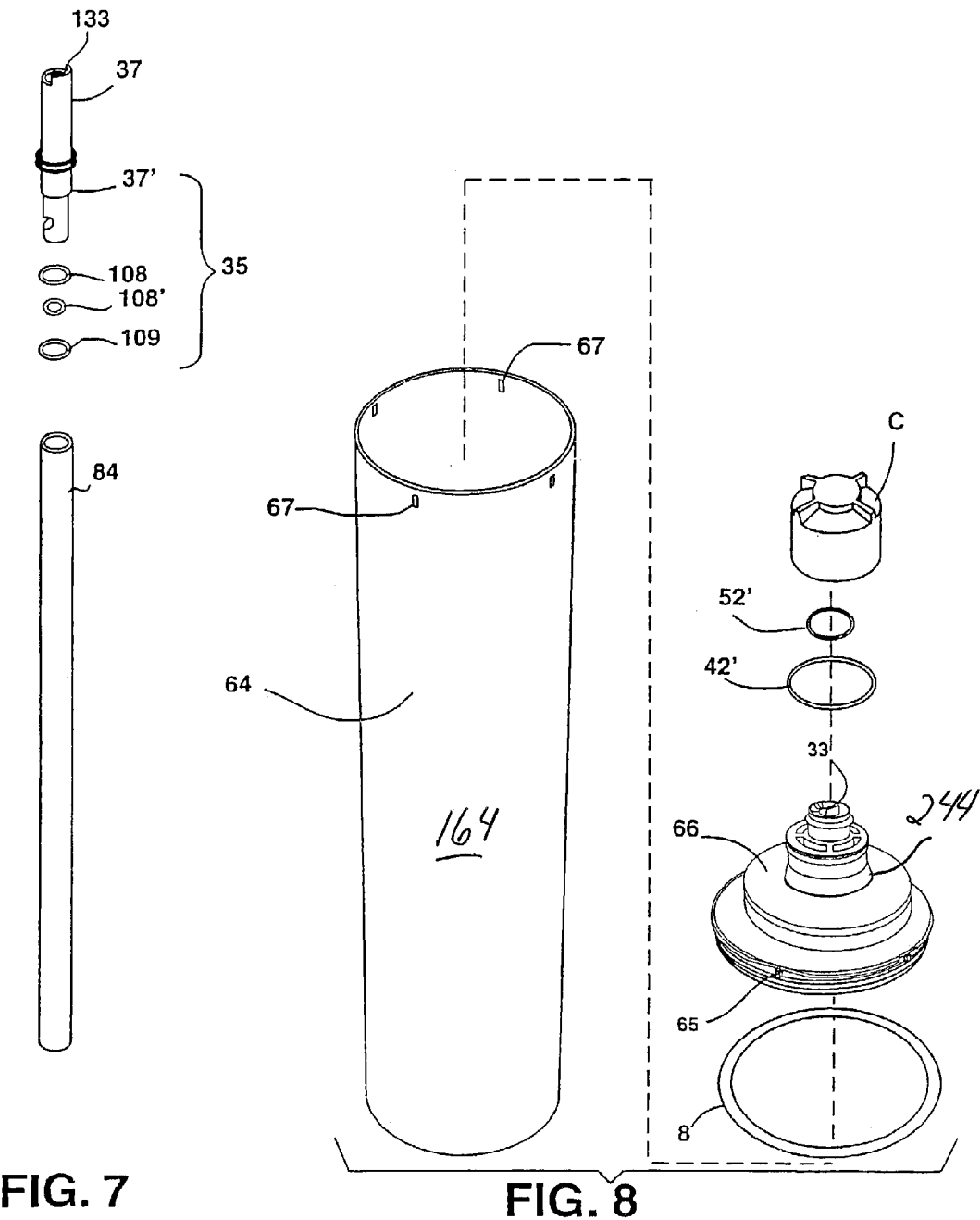

PRESSURE VESSEL AND RECYCLABLE FILTER CARTRIDGE

DESCRIPTION

This application is a continuation-in-part of and claims priority of prior application Ser. No. 10/110,605, entitled "Recyclable Filter Cartridge and Pressure Vessel" issued on Jun. 10, 2003 as U.S. Pat. No. 6,576,129, and provisional application No. 60/159,018, filed on Oct. 12, 1999.

BACKGROUND OF THE INVENTION

1. Field of the Invention

The present invention generally relates to filter cartridges for water or beverages, such as those used in water, ice-water, soda pop machines, or other beverage dispensers. Specifically, the invention is a filter assembly, for cooperation with a filter head/manifold, that includes a filter cartridge substantially comprising recyclable components. More specifically, the invention relates to a filter assembly that allows all or substantially all of the surfaces that contact liquid to be periodically removed and recycled, thereby reducing the chance of contamination from long-term use of the surfaces. The filter cartridge is substantially non-pressure bearing, except for the neck of the filter cartridge that extends to form a liquid seal with the head/manifold or optionally except for the cap of the filter cartridge including the neck. A pressure vessel substantially surrounds the filter cartridge for holding and supporting the walls of the filter cartridge under liquid pressure, but the pressure vessel does not necessarily liquid-seal to the filter cartridge or the filter head/manifold.

2. Related Art

Many filter systems for water or other liquid filtration comprise a filter that cooperates with a "filter head," which term herein includes a fluid manifold, valve head, or other connection device that directs fluid to and from the filter. The filter typically seals to an internal surface of the filter head so that the liquid entering the filter head flows into the filter, through the filter, then out of the filter to an outlet port in the filter head. In the United States and Canada, water filters are typically required to contain and withstand pressures of about 500 psi without rupturing. In the United States, water systems typically operate in the range of 40–125 psi, and NSF (National Sanitation Foundation) approval ratings typically require a water filter to withstand 4 times the claimed maximum operating pressure, or typically 500 psi. In Canada, safety factors require that water filters withstand about 508 psi for one minute. In Europe, some safety preferences dictate a burst pressure of no less than 475 psi.

In one general type of filter system, a disposable pressure vessel connects directly to a filter head. In such a system, when the filter media inside the pressure vessel is spent, the entire pressure vessel must be discarded, including the media contained therein. Disposable pressure vessels are not easily recyclable as there are no easy means to disassemble the pressure vessel. The disposable pressure vessel outer wall is entirely pressure-bearing, that is, it may safely withstand the liquid pressure of the particular system with a large safety margin. Therefore, disposable pressure vessels are more costly to replace because they use more plastic or more expensive materials such as aluminum. Use of disposable pressure vessels is, therefore, costly in terms of filter expense and environmental impact.

In alternative filter systems, a disposable filter cartridge may be supplied inside a pressure-bearing housing that connects to the filter head. In such a system, the pressure-bearing housing typically seals to the head using o-rings or other seals and surfaces that are contacted by the liquid being filtered. When the media of the filter cartridge is spent, the filter cartridge is typically discarded and replaced with another cartridge. The conventional filter cartridge has few recyclable components, and, the few recyclable components of the cartridge, such as granular carbon contained in the cartridge, are not removable or easily accessible to a person who might want to recycle. While the filter cartridge is removed and thrown away, the thick-walled pressure vessel is reused. During use, portions of the pressure vessel come in contact with the liquid being filtered, and, therefore, the pressure vessel may become contaminated with bacteria or other unhealthy substances. Because the pressure vessel is continually reused, the contaminated portions remain in use in the filter system and can further the contamination problem in the filter system and in the liquid flowing through it.

Therefore, there is a need for an improved filter cartridge, which is substantially recyclable and which, therefore, reduces the resource and environmental created by the filter cartridge. Also, there is a need for an economical and efficient filter cartridge that is designed so that every time the filter cartridge is removed for recycling, the surfaces with the highest chance of being contaminated are also replaced. The filter assembly of the present invention fulfills these needs.

SUMMARY OF THE INVENTION

The present invention comprises a filter assembly featuring a substantially recyclable filter cartridge. The preferred cartridge includes substantially all components which are recyclable: a cartridge body, cartridge cap, media, media-support and containment pads, and center stem/tubes. The cartridge preferably, but not necessarily, includes an invented mechanism or "latch" for disassembly of the components of the filter cartridge so that the components may be separated and sent to appropriate recycling processes. Further, the total amount of plastic or more expensive materials used in the filter cartridge is substantially less than in a conventional filter, resulting in an overall inexpensive and less problematic disposal problem, which in general can be handled by recycling of the small amount of plastic used in the filter cartridge instead of by disposal and landfill.

The invented filter assembly preferably, but not necessarily, includes a pressure-bearing "pressure vessel" that substantially surrounds the filter cartridge except for the protruding neck of the filter cartridge. The pressure vessel comes in close contact with the filter cartridge to safely support and reinforce the non-pressure-bearing portions of the filter cartridge, but does not necessarily seal to the cartridge. The filter cartridge neck is pressure-bearing and protrudes out from the pressure vessel to liquid-seal directly to the filter head, in such a manner that the entire outer surface of the filter cartridge is dry, that is, not contacted by liquid during filtration, and the entire outward pressure of liquid relative to the atmosphere is directed against the interior walls of the filter cartridge. This liquid pressure is contained inside the filter cartridge neck without reinforcement, while the liquid pressure is contained inside the filter cartridge body by virtue of the surrounding pressure vessel reinforcing the filter cartridge body wall. This is preferably accomplished by a thin-walled filter cartridge body with the neck wall or the cap including the neck wall being significantly thicker than the filter cartridge body wall, which results in excellent pressure containment and NSF Safety Factors with a much-reduced amount of total plastic to be recycled after use.

Objects of the present invention, therefore, include providing a recyclable filter cartridge for water and beverage filtration, herein including filtering, treatment, or other processing. An object is to provide such a recyclable filter cartridge that greatly reduces the environmental impact of the plastics and other materials used in the filter cartridge, and that is easily disassembled for separation of the various components for proper recycling. A further object is to make the filter cartridge recyclable while minimize the total amount of plastic that must be dealt with in the recycling process. This minimization of total recycled plastic is preferably done by providing a thin filter cartridge outer wall except for the pressure-bearing neck or except for the cap including the neck, which neck or cap including the neck constitute a very small amount of wall area compared to the much large filter cartridge body. Another object is to provide a filter cartridge system in which all or substantially all of the surfaces that liquid contacts after leaving the filter head and prior to returning to the filter head are removed from the system when the filter cartridge is removed for recycling. Thus, the liquid-contact surfaces are filter cartridge surfaces rather than pressure vessel surfaces, and are replaced each time the filter cartridge is replaced.

BRIEF DESCRIPTION OF THE DRAWINGS

FIG. 4A is an enlarged detail cross-sectional side view of the top end of the filter assembly, which is the end circled in FIG. 3. FIG. 4B is an detail cross-section view as in FIG. 4A, with the dust cap removed and with the filter cartridge connected to one embodiment of a filter head represented schematically.

FIG. 7 is an exploded side perspective view of the central stem, optional liquid bypass sleeve and o-rings, of the cartridge of FIGS. 1–4.

FIG. 8 is an exploded side perspective view of the cartridge body, cartridge cap including inlet tube member in the cap, sealing members, and dust cap of the embodiment of FIGS. 1–4.

DESCRIPTION OF THE PREFERRED EMBODIMENTS

Figure 4A:
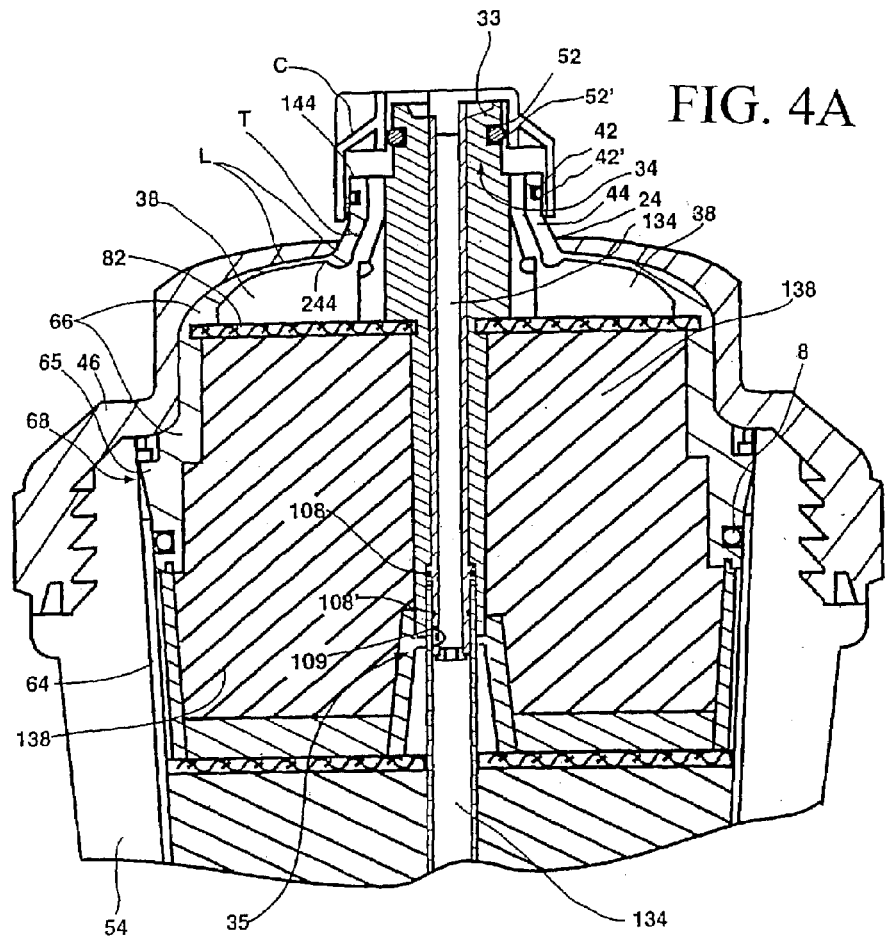
FIGS. 4A and 4B.
Figure 4B:
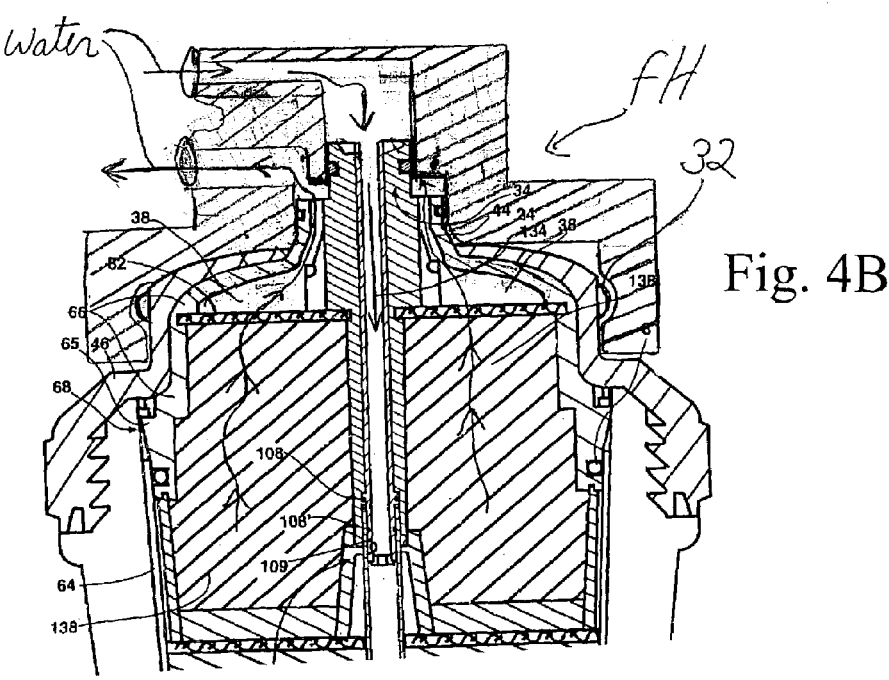
Figure 5:
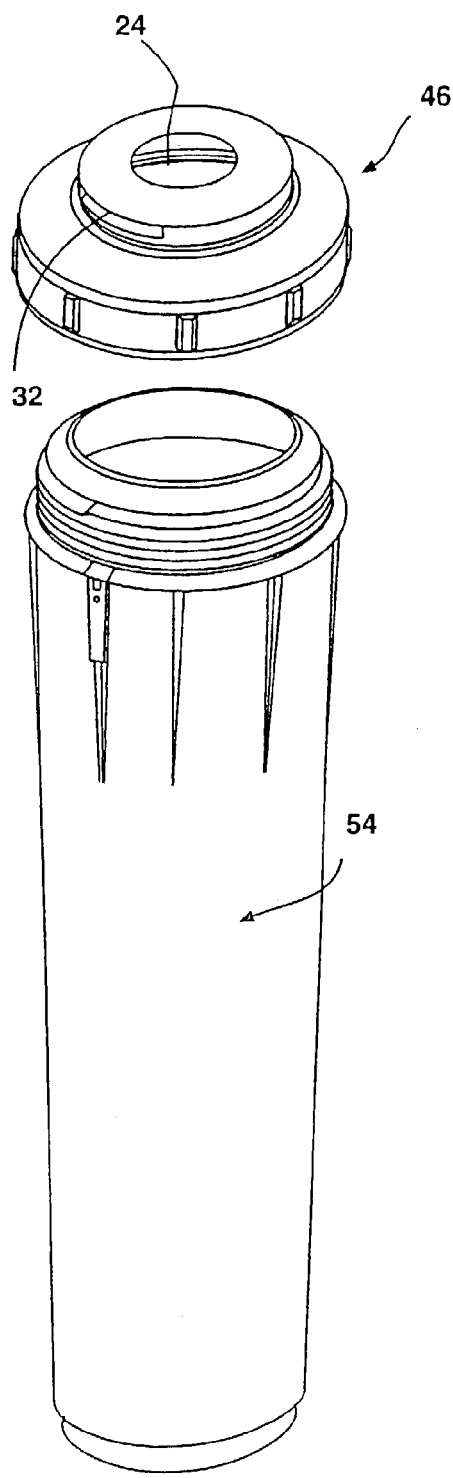
FIG. 5 is an exploded side perspective view of the pressure vessel, which comprises a pressure body and pressure cap of the filter assembly of FIGS. 1–4.
Figure 6:
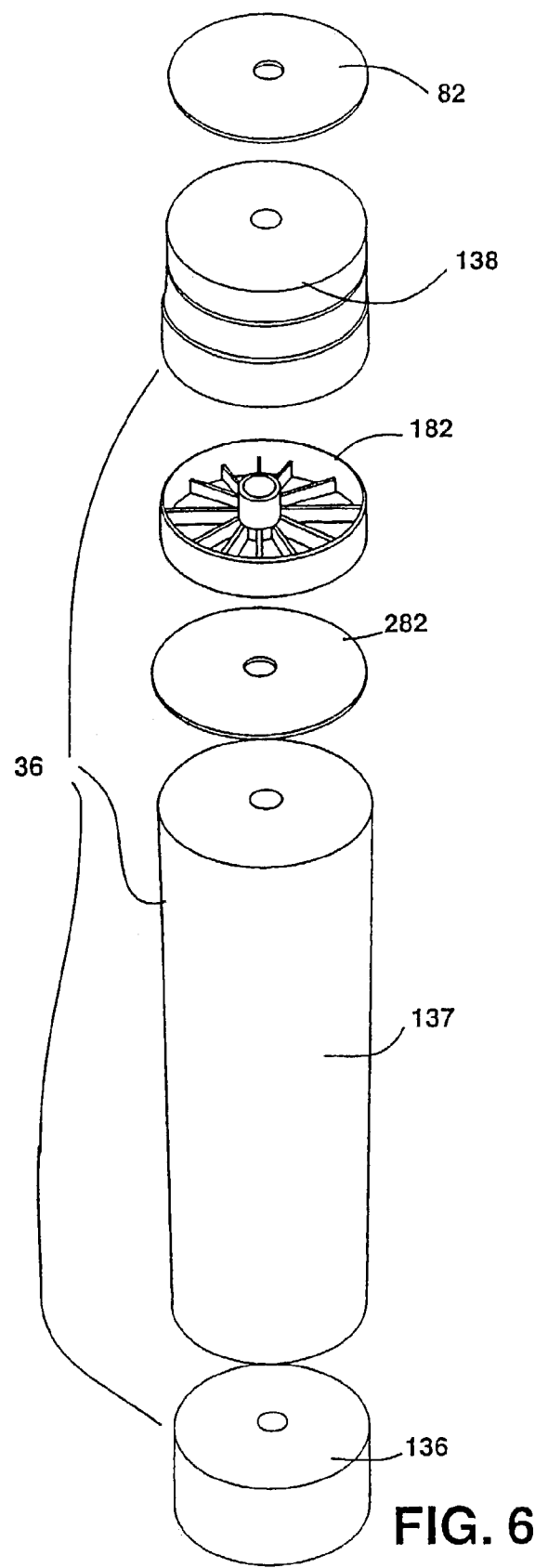
FIG. 6 is an exploded side perspective view of the filter materials, media supports and filter pads, of FIGS. 1–4.
Figure 10:
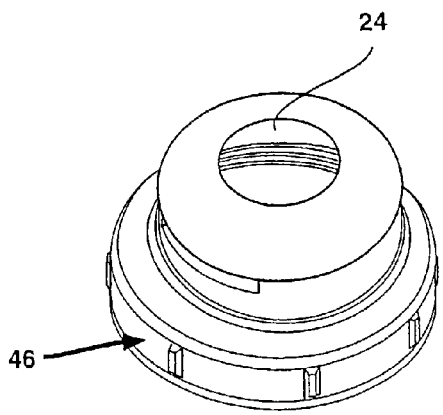
FIG. 10 is a perspective view of the pressure vessel cap of the embodiment of FIG. 10.
Figure 9:
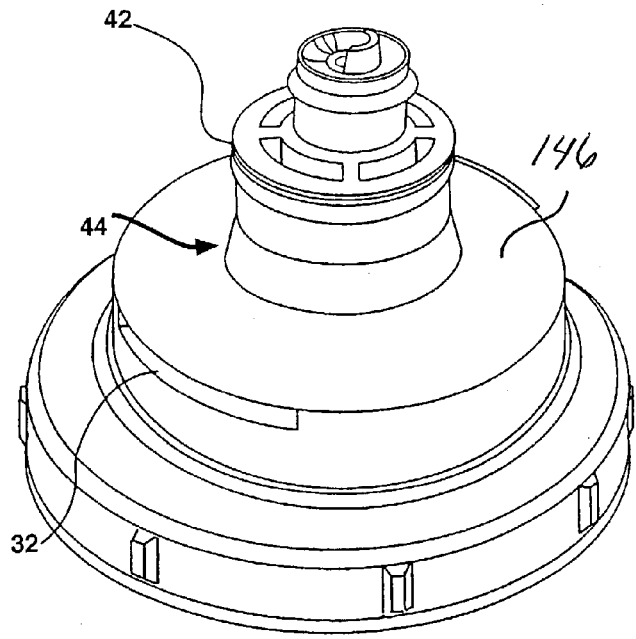
FIG. 9 is a close-up perspective view of the exterior of the embodiment of a cartridge cap installed in a pressure vessel cap, according to the invention, with neck protruding through and up from an opening in the pressure vessel cap.
Figure 11:
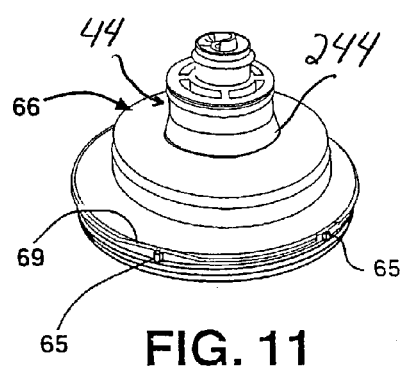
FIG. 11 is a perspective view of filter cartridge cap of FIG. 9, shown separate from the pressure vessel cap.

Referring to the Figures, there is shown one embodiment, but not the only embodiment, of the invented filter assembly 20 which includes filter cartridge 30 inside pressure vessel 22. The invented assembly 20 comprises a pressure vessel 22 which is visible as substantially the exterior surface of the assembly, and which has an aperture 24 through which the neck 44 of the filter cartridge 30 extends to seal directly to a filter head. The invented assembly 20 may be adapted for being secured to the filter head by several different ways, for example, the preferred bayonet mount 32 on the pressure cap 46, a threaded mount, or other connection means. Preferably, the invented pressure vessel mechanically connects to the filter head, by such a connection means, but does not fluidly connect, that is, it does not fluidly seal, to the filter head. The filter assembly of the invention may be adapted to cooperate with various filter heads, by adapting the connection means and the size and shape of the neck, which preferably comprise the filter cartridge liquid inlet and outlet passages. The preferred embodiment of the filter assembly 20 shown in the drawings may cooperate with a filter head such as the type illustrated by the systems in U.S. Pat. No. 4,857,189, Design 356,625, or U.S. Pat. No. 4,956,086 and, once the disclosure of the present invention is viewed, one of skill in the art will be able to construct a filter head that will operatively connect with the invented filter cartridge. In FIG. 4B, a filter cartridge according to one embodiment of the invention is shown attached to a schematic representation of one filter head (FH) that might be used with the cartridge. The cartridges conventionally built for such systems as shown in U.S. Pat. Nos. 4,857,189, Design 356,625, or U.S. Pat. No. 4,956,086 are of the type described in Related Art as a non-recyclable filter with its outer wall being entirely pressure-bearing.

In the preferred embodiment, fluid flows via the filter head into the central axial passage 134 in the filter cartridge 30 via an inlet end 33 of inlet tube member 34 out the bottom of the central axial passage, up through the filter media 36 (which may comprise one or more media, empty spaces, pads, supports, etc), and out of the filter cartridge 30 through a concentric annular passage 38 around the inlet tube member 34. In the preferred embodiment, shown to particular advantage in FIG. 3, there are three different media in series 136, 137, 138, but other arrangements may be used. The filter cartridge may optionally include a liquid bypass system 35 for allowing some liquid flowing down the inlet tube member 34 to exit the central axial passage 134 part way down the tube to flow directly to, for example, the top bed 138 of media rather than flowing through all three beds of media. The liquid bypass system 35 may include one or more holes of a diameter sized to let a particular amount of liquid bypass the lower media, or may be other systems. The liquid bypass system 35 design is optional and is not required for the invented apparatus or practicing the invented filtration methods.

Figure 1:
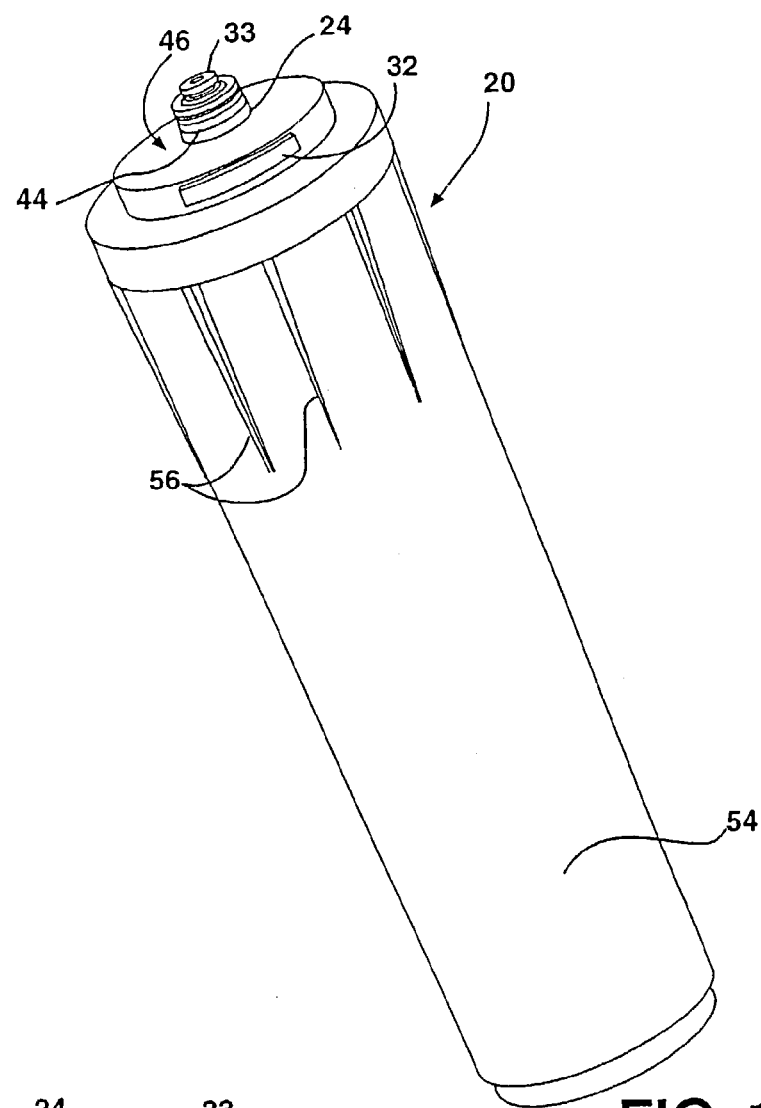
FIG. 1 is a top perspective view of one embodiment of the invented filter assembly.
Figure 2:
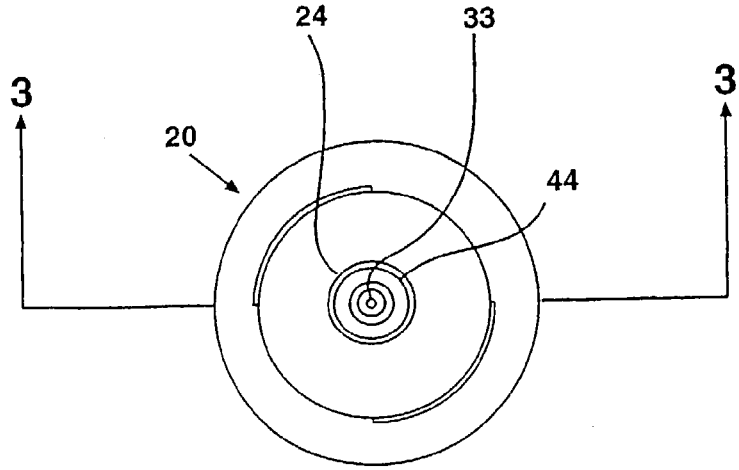
FIG. 2 is a top view of the filter assembly of FIG. 1.
Figure 3:
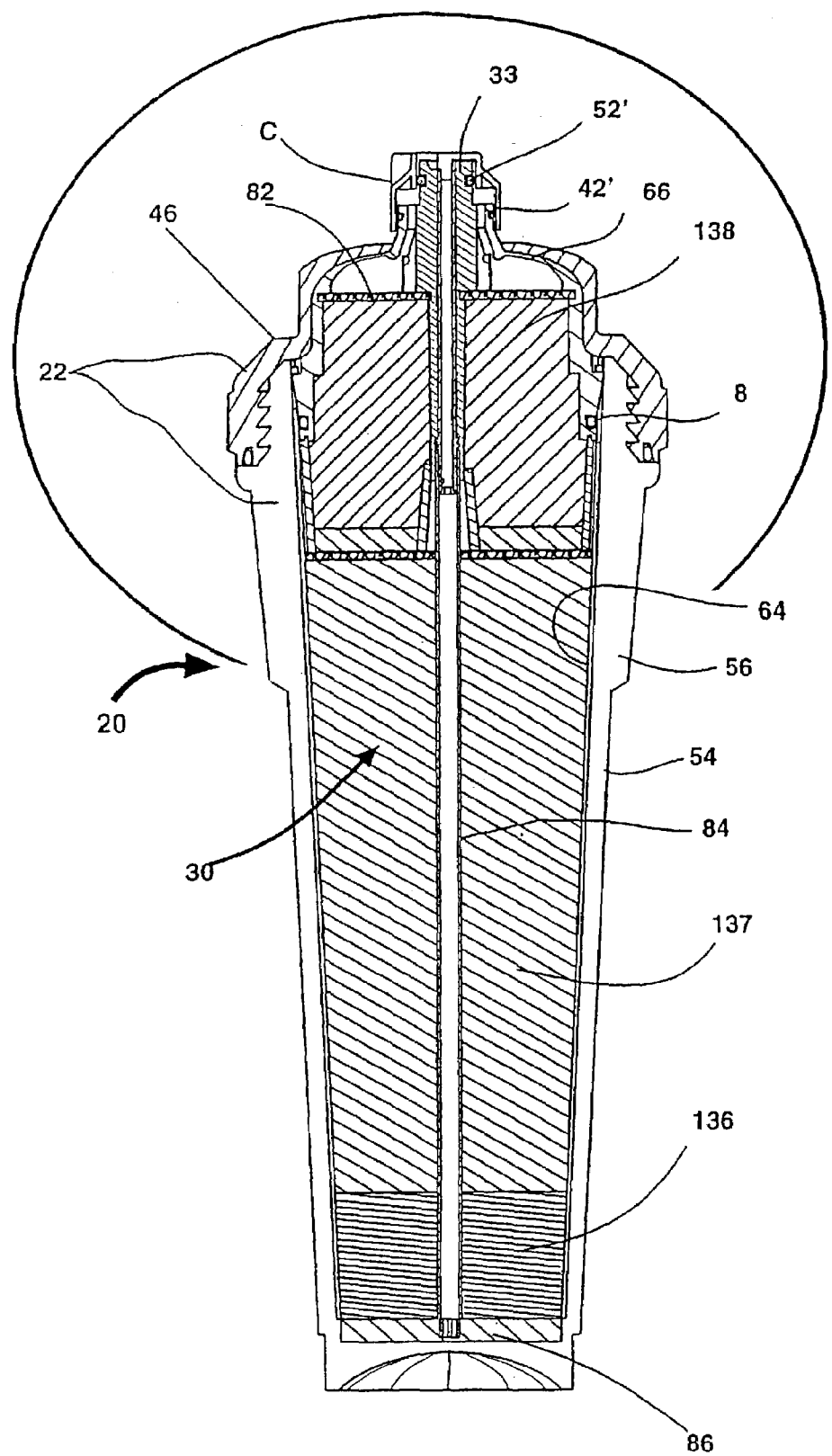
FIG. 3 is a cross-sectional view of the filter assembly of FIGS. 1 and 2, viewed along the line 3—3 in FIG. 2, with a dust cap installed.

The filter cartridge 30 extends up through a central opening (aperture 24) in the pressure cap 46 and seals to the filter head (not shown) at two locations, at o-ring 42' (shown in FIGS. 3 and 8, in groove 42) and at a small diameter o-ring 52' (shown in FIGS. 3 and 8, in groove 52). This way, the neck provides and holds both seals necessary to fluidly connect the filter cartridge to the head using the concentric, annular inlet and outlet system of the filter cartridge. That is, as the preferred embodiment is arranged, the inlet to the filter cartridge is sealed at seal location 52 and the outlet of the filter cartridge is sealed between o-rings 42' and 52'.

The pressure vessel 22 comprises a pressure body 54, which is a generally cylindrical member with a closed end and an open end, and a pressure cap 46 that connects to the pressure body across its open end. The connection may be a threaded connection, as shown in the drawings, but may be other designs. The pressure body 54 preferably has axial exterior ribs 56 for strengthening the body. The pressure cap 46 has top aperture 24 in its generally radial upper wall 146, centered along the central longitudinal axis of the pressure vessel 22 for receiving the protruding neck 44 to an extent that allows the filter cartridge to mate appropriately to the head with the sealing locations 42, 52 well above the pressure cap.

Inside the interior space of the invented pressure vessel 22 is placed the invented filter cartridge 30. The cartridge 30 comprises a cartridge body 64 with outer side wall surface 164 and a cartridge cap 66 that connect preferably by a snap connection 68 but may be connected by other means. The connection of cartridge body 64 and cartridge cap 66 preferably includes an o-ring 8 or other liquid-sealing mechanism to prevent liquid from leaking out between the cartridge body and cartridge cap.

The cartridge body 64 is generally cylindrical with a closed bottom and an open top across which the cartridge cap 66 extends. The cartridge cap 66 includes radially-outwardly-protruding tabs 65 that are spaced circumferentially around the bottom region of the cartridge cap 66. The tabs 65 snap into circumferentially-spaced slots 67 near the top of the cartridge body for connecting the body and cap after the cartridge internals and media have been installed. The top end of the cartridge cap includes cylindrical neck 44 which is significantly smaller in diameter than the largest diameter of the cap and significantly smaller in diameter than the diameter of the top of the filter cartridge body. Preferably, the neck 44 has an outer diameter (at the outer neck wall) of less than or equal to half of the diameter of the largest diameter of the cap, and less than or equal to half of the diameter of the diameter of the top end of the filter cartridge body. Preferably, the neck 44 has adaptation on its outer surface for holding an o-ring at circumference groove 42.

The preferred internals and media of the filter cartridge comprise one or more filter or treatment media 36, a top media felt pad 82, media separator 182, separator felt pad 282, a central tube ("stem" 84), the inlet tube member 34 connected to stem 84 and having inlet end 33, and o-rings 42', 52', bypass tube 37, o-ring 108 sealing bypass tube 37 to inlet tube member 34, and is bypass system 35 is included, o-ring 108' sealing bypass tube 37 to stem 84, and o-ring 109. If bypass system 35 is excluded, the tube member 34 could be adapted to seal to stem 84. The central stem 84 lies on radially-formed ribs 86 on the interior bottom wall of the cartridge body 64. Ribs 86 create a fluid path from the inside of stem 84 into media 36. The stem 84 upends from the ribs 86 to extend through the interior space and through the pads, media separators, and media 36 contained therein to seal with the inlet end 33. The media 36 may be any single media or combination of media desired for liquid/beverage treatment, filtration or conditioning. Media 36 are preferably granular activated carbon and ion exchange resin, and this media choice may be taken into account by one skilled in the art when selecting the supports and pads below, between, and above the various media.

Figures 12, 13:
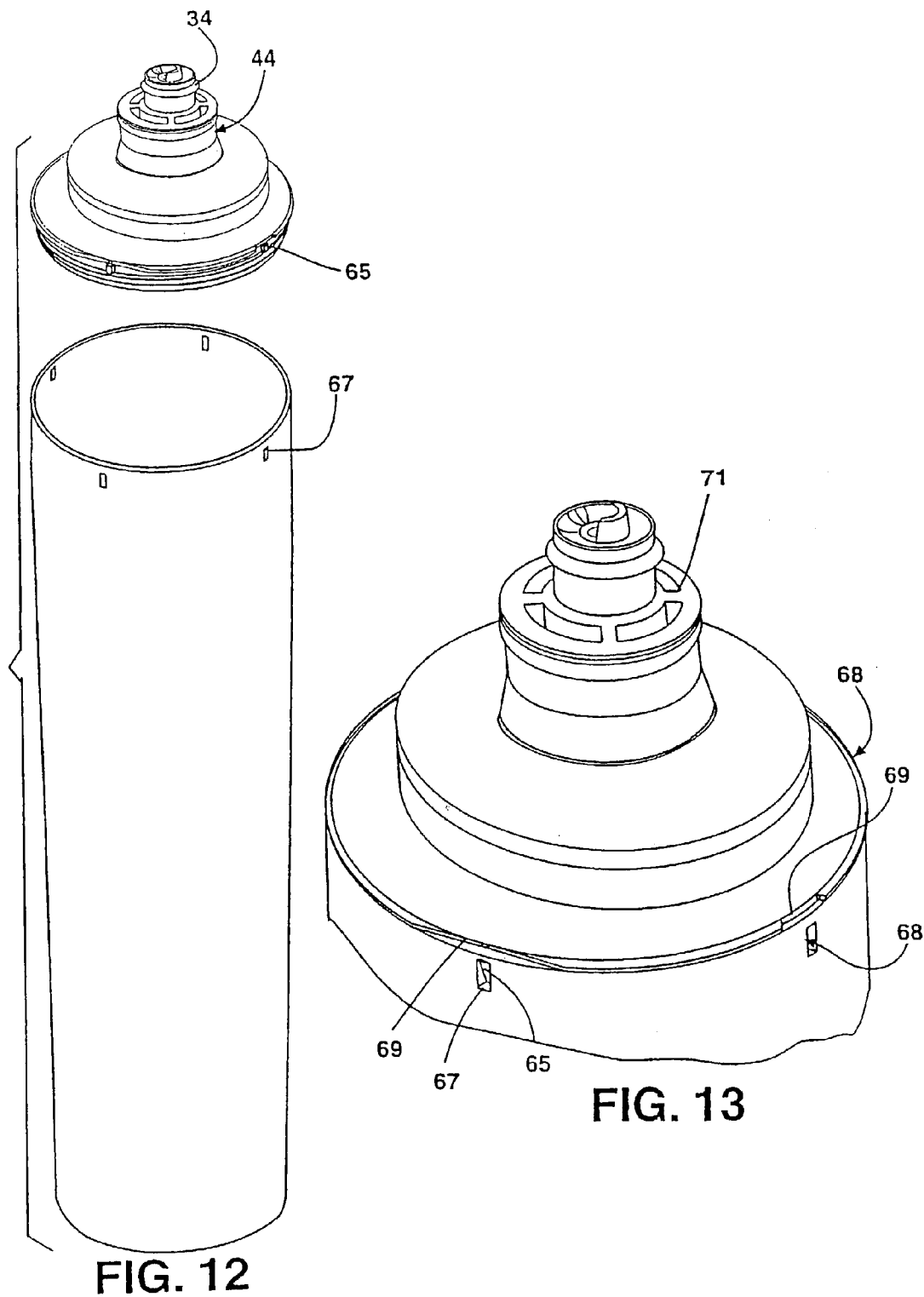
FIG. 12 is an exploded perspective view of the cartridge body and cartridge cap of FIGS. 3 and 8, separated to illustrate one embodiment of a tab and slot connection system for snapping the body and cap together.
FIG. 13 is a perspective view of the top end of the filter cartridge of FIGS. 3, 8, and 12, illustrating the cartridge cap snapped into the cartridge body.

Inside and coaxial with inlet tube member 34 is an optional bypass sleeve 37 with a lower portion 37' that connects to stem 84 and may optionally have holes, o-rings, or other structure for providing a liquid bypass system. The structure 133 shown at the top of the sleeve 37 and in the top inside view of sleeve 37 in FIGS. 12 and 13 may cooperate with the dust cap C shown in FIGS. 3, 4, and 8. Dust cap C may be used to keep the inlet and outlet of the cartridge clean, and, optionally, may cooperate with structure 133 to allow adjustment of the sleeve 37 to adjust the liquid bypass by rotating the sleeve. As stated above, the liquid bypass is optional and may be closed, blocked off or eliminated.

From a fluid flow point of view, the fluid enters the inlet end 33 (and through the interior of sleeve 37) and flows down into the stem 84, and out through radial ribs 86 in the bottom of cartridge body 64 to the media 136. As mentioned above, a liquid bypass system 35 may optionally be incorporated to allow a portion of the liquid to flow only through a portion of the media zones. From the media 136, the liquid flows generally axially upwards through the other media 36, supports and pads, through apertures in the inlet tube base and into the annular space 38 between the inside surface of the cartridge cap 66 and the outside surface of the inlet end 33. Annular space 38 may include ribs 71 running axially in the annular space 38 to stabilize the inlet end 33 relative to the cartridge cap.

As can be seen to best advantage in FIG. 3, the cartridge 30 fits closely inside the pressure vessel 22, and the pressure vessel 22 acts as a reinforcing shell around substantially all of the cartridge 30. Unlike many conventional filter cartridges, however, the cartridge 30, particularly neck 44, of the present invention extends at its top end out of the pressure vessel to seal directly to the filter head. The pressure vessel and filter cartridge, therefore, need not liquid seal to each other, although the inventor envisions adequate embodiments that would include sealing between the filter cartridge and pressure vessel. In the preferred embodiment, liquid does not flow or reach between the pressure vessel cap and the cartridge cap, that is, there need be no liquid seal in the general location L where the two caps 46, 66 contact or come near to each other near the aperture 24. Also, the cartridge body 64 need not seal to the inner surface of the pressure vessel body 54, but should be closely adjacent.

The various components of the cartridge 30 are preferably recyclable. Specifically, the cartridge body 64, cap 66, stem 84, spacer 86 are preferably recyclable polyethylene, polypropylene, or acrylonitrile butadiene styrene (ABS) for example. The various media 36 are preferably recyclable carbon, resin, or other material. The internal pads and medai supports are preferably made of recyclable materials such as polyurethane or polypropylene. The O-rings may not be recyclable, but these are preferably the only components that are not, and they are very small, easily removed and should be removed and discarded to prevent back-contamination with any bacteria or pathogens that might be present on them or on the o-ring lubricating oil.

The absolute wall thickness of the neck 44 is important as it is critical to the filter cartridge and the filter assembly, in general, meeting safety requirements for withstanding water pressure of the system to which they are connected. For example, to withstand a 500 psi test, the polypropylene neck wall thickness T preferably greater than or equal to 0.125 inch in thickness, while the filter cartridge body wall preferably only about 0.060 inches (typically in the range of 0.050–0.070) in thickness. Therefore, the body wall typically is less than about half the thickness of the neck thickness. Other thicknesses may apply for various materials and pressure requirements. As shown in FIGS. 3 and 4A, the neck preferably may be thick-walled from the top 144 of the neck, all the way through the aperture 24 and for a slight distance down into the pressure vessel to neck bottom 244, to prevent rupturing of the neck in the vicinity of the aperture 24, as this is the neck wall area wherein the thick pressure-bearing feature is especially required. Optionally, the cap may be thick-walled further down into the pressure vessel or the entire cap may be thick-walled, for ease of manufacture, for example. Still, with either option (of substantially only the neck of the cap being thick-walled, or all/substantially all of the cap being thick-walled), the filter cartridge body is thin-walled and non-pressure bearing, as the body is the largest element of the filter cartridge and is generally controlling in the economy of manufacture and recycling efficiency. Thus, for example, the entire plastic cap may comprise a wall of greater than or equal to 0.125 inch thickness, while the entire plastic body wall may be in the range of 0.05–0.07 inches thick, for example. FIG. 4B illustrates one embodiment of a cap that is thick all along its wall, from the top of the neck to its connection to the body.

The inlet tube member 34 wall, which also extends up coaxially with the neck wall out of the pressure vessel, does not need to be of a thickness comparable to the neck wall, because the inlet tube is not exposed to a large pressure difference as the neck wall is. The neck wall withstands the full pressure difference between the water in the neck and the outside atmosphere, while the inlet tube has water both inside it (inlet water) and outside it (outlet water) and the pressure difference between the two water streams is only the pressure drop through the filter cartridge.

Therefore, one may describe the preferred invented filter cartridge as having an exterior wall having a high strength portion and a low strength portion. In the preferred embodiment, the exterior wall is the entire outer wall of the filter cartridge including the body and cap. The high strength portion is defined as being adapted to withstand pressure of greater than or equal to 200 psi, and most preferably greater than or equal to 475 psi, and is preferably a neck that extends up from the center of one end of the filter cartridge, or, alternatively the cap including the neck. The low strength portion is defined as being adapted to withstand only minimal pressure, for example less than or equal to 50 psi, and, in order to minimize the total plastic, more preferably less than or equal to 10 psi, and is preferably the entirety of the outer wall of the filter cartridge except the above described neck, or alternatively, the entire outer wall of the filter cartridge except for the cap including the neck. Also, the term "pressure bearing" in this Description and Claims means positioned and capable of bearing by itself (without significant reinforcement) the pressure of the fluid in the process in which it is being used. The term "non-pressure bearing" means that a part or portion of a structure is not positioned in a place where it will be exposed to significant pressure, that is, not more than a negligible amount, and especially not more than about 50 psi.

One may see from this description and the drawings, that the filter assembly, comprising the filter cartridge and the pressure vessel, may be removed from the head and the recyclable filter cartridge 30 may easily be removed from the pressure vessel by unscrewing or otherwise disconnecting the pressure cap from the pressure body. Then, the cartridge may be recycled after being disassembled as described below, for example. Other mechanisms for easy opening of the filter cartridge may be used, and these are called herein "latch mechanisms" as they allow closing of the filter cartridge after filling of the cartridge body with media, and then allow opening of the filter cartridge without excessive force or destruction of the body or cap after use. In this Description and the Claims, latch does not imply that no cutting or removal of filter cartridge material may be done to unlatch parts of the exterior wall, but preferably only cutting or removal of a tab or other small portion of a latch is done rather than destruction by impact, sawing, or slicing the body. Preferably, two parts of the low strength portion of the filter cartridge exterior wall are the parts that are "latched" and "unlatched," at a seam or connection 68, for example. When the preferred cartridge is removed from the preferred pressure vessel, the cartridge takes with it all the surfaces and seals that have contacted liquid on the "filter assembly side" of the process. Thus, potentially contaminated surfaces and o-rings are removed periodically rather than remaining with the reused pressure vessel. Some contamination may reside on the "filter head side" of the process, because the filter head is not recycled or replaced, but the total head surfaces as typically small in area, and, if the o-rings are removed with the filter cartridge, the chances of o-ring lubricant contamination, for example, are minimized.

In order to disassemble the cartridge 30, special adaptation is preferably included to allow separation of the components of the cartridge 30 without crushing or cracking the cartridge. Preferably, the adaptation is such that accidental separation is unlikely, but purposeful separation prior to recycling is easy with the correct tool. Preferably, the adaptation comprises a snap-in tab and slot system, illustrated to best advantage in FIGS. 12–13, or other separation system for opening the cartridge, preferably without cracking, crushing, or drilling through the cartridge housing. The tabs 65 are typically formed integrally with the cartridge cap 66 near its lower end. The cooperating slots 67 near the upper edge of the cartridge body 64 receive the tabs 65 in snap-fit manner, to semi-permanently connect the cap 66 to the body 64. The outer perimeter of the lower end of the cap 66 includes cut-away portions 69 directly above each tab 65 so that the tab and slot connection may be reached by a tool. When the user of recycler wishes to disassemble the filter cartridge 30, he/she may slide a knife or sharp tool down between the cap 66 and the body 64 directly above the tab and slice downward on the tab to remove enough of the tab to release the body from the cap. This, or other types of separation, allow a person or equipment to reach inside the cartridge, to remove the internals and the media from the cartridge for recycling of the internals and media as well as the external cap and body components.

FIG. 4B illustrates the flow into and out of the preferred filter cartridge, and one of various filter heads (FH) that may be adapted for use with embodiments of the invented filter cartridge.

Although this invention has been described above with reference to particular means, materials and embodiments, it is to be understood that the invention is not limited to these disclosed particulars, but extends instead to all equivalents within the scope of the following claims.

I claim:

1. A liquid filter assembly for connection to a filter head, the filter assembly comprising a pressure vessel and a filter cartridge removably received in the pressure vessel, the filter cartridge comprising:

a generally cylindrical housing surrounding an interior volume receiving filter media and having a central longitudinal axis and a radial dimension transverse to the central longitudinal axis, the housing having a housing wall comprising an axial outer sidewall with an outer diameter, a generally radial outer bottom wall forming a cartridge bottom end, a generally radial outer top wall forming a cartridge top end, and the housing further having a neck upending axially from the top wall at or near said central longitudinal axis, wherein the neck has a neck outer diameter that is smaller than the outer diameter of said outer sidewall;

wherein the neck comprises a neck wall with an outer surface, an inner surface, a neck lower end attached to the top wall, and a tube member generally coaxial with the neck wall and having a central axial passage, the tube member being spaced from the neck wall inner surface to create a neck annular passage between the tube member and the neck wall, wherein said central axial passage and said neck annular passage are liquid inlet and outlet passages for the filter cartridge;

wherein the neck wall has a thickness adapted to withstand pressure in the neck annular passage at least 200 psi greater than pressure outside the neck wall;

wherein said pressure vessel surrounds and reinforces the entire housing except for the neck, the pressure vessel having a generally radial upper wall with an aperture through which the neck protrudes and wherein said upper wall extends from near the outer sidewall of the housing across the top wall of the housing generally radially to the lower end of the neck wall to cover and reinforce the entire cartridge top end except for the neck; and wherein said pressure vessel comprises a first portion and a second portion adapted to be detached from each other so that the pressure vessel is openable for removing of said filter cartridge from the pressure vessel.

2. The liquid filter assembly of claim 1, wherein the neck outer diameter is about half the outer sidewall outer diameter.

3. The liquid filter assembly of claim 1, wherein the neck wall has a thickness of greater than or equal to 0.125 inches.

4. The liquid filter assembly of claim 3, wherein the housing wall has a thickness in the range of 0.05–0.70 inches.

5. The liquid filter assembly of claim 3, wherein the housing wall has a thickness of less than about half of the neck wall thickness.

6. The liquid filter assembly of claim 3, wherein the neck wall is polypropylene and wherein the housing wall is polypropylene and has a thickness of about half of the neck wall thickness.

7. The liquid filter assembly of claim 1, wherein the housing wall has a thickness adapted to withstand a pressure inside the housing wall of no more than 10 psi greater than outside the housing wall.

8. The liquid filter assembly of claim 1, wherein said filter housing wall is plastic and comprises a latch that is unlatchable so that the filter housing wall is openable for emptying of media out from the filter cartridge and recycling of the plastic of the housing wall.

9. The liquid filter assembly of claim 8, wherein said housing wall comprises a body portion and a cap portion and said latch comprises a tab on said body portion extending into said cap portion, and wherein the latch is unlatchable by cutting the tab off of the body.

10. The liquid filter assembly of claim 1, wherein said neck wall comprises a sealing member for sealing to a fluid passage of a filter head, and said tube member comprises a sealing member for sealing to a fluid passage of the filter head, and wherein the filter cartridge comprises no means for liquid-sealing the filter cartridge to a filter head other than said sealing member of the neck wall and said sealing member of the tube member.

11. The liquid filter assembly of claim 1, wherein said pressure vessel does not fluid-seal to the filter cartridge.

12. A filter system comprising a liquid filter assembly and a filter head with inlet and outlet fluid passage, the filter assembly comprising a pressure vessel and a filter cartridge removably received in the pressure vessel, the filter cartridge comprising:

a generally cylindrical housing surrounding an interior volume receiving filter media and having a central longitudinal axis and a radial dimension transverse to the central longitudinal axis, the housing having a housing wall comprising an axial outer sidewall with an outer diameter, a generally radial outer bottom wall forming a cartridge bottom end, a generally radial outer top wall forming a cartridge top end, and the housing further having a neck upending axially from the top wall at or near said central longitudinal axis, wherein the neck has a neck outer diameter that is smaller than the outer diameter of said outer sidewall;

wherein the neck comprises a neck wall with an outer surface, an inner surface, a neck lower end attached to the top wall, a liquid seal member on the neck wall, and a tube member generally coaxial with the neck wall and having an central axial passage, the tube member being spaced from the neck wall inner surface to create a neck annular passage between the tube member and the neck wall and the tube member having a liquid seal member, wherein the central axial passage and the neck annular passage are liquid inlet passage and liquid outlet passages for the filter cartridge;

wherein the neck wall has a thickness adapted to withstand pressure in the neck annular passage at least 200 psi greater than pressure outside the neck wall;

wherein the pressure vessel surrounds and reinforces the entire housing except for the neck, wherein the pressure vessel has a generally radial upper wall with an aperture through which the neck protrudes and wherein said upper wall extends from near the outer sidewall of the housing generally radially across the top wall of the housing to the lower end of the neck wall to cover and reinforce the entire cartridge top end except for the neck; and wherein the pressure vessel is mechanically connected to the filter head and wherein the tube member liquid seal member and the neck wall liquid seal member seal to said inlet and outlet filter head passages so that liquid flows from the filter head in and out of the filter cartridge via the central axial passage and the neck annular passage and does not contact any surfaces of the filter head except said inlet and outlet filter head passages, does not contact the pressure vessel, and does not contact the neck wall outer surface below said liquid seal member of the neck wall, for minimizing surface area of filter head and external surface area of the filter cartridge exposed to the liquid during use.

13. The liquid filter assembly of claim 12, wherein the neck outer diameter is about half the outer sidewall outer diameter.

14. The filter system of claim 12, wherein the neck wall has a thickness of greater than or equal to 0.125 inches.

15. The filter system of claim 14, wherein the housing wall has a thickness in the range of 0.05–0.70 inches.

16. The filter system of claim 14, wherein the housing wall has a thickness of less than about half of the neck wall thickness.

17. The filter system of claim 14, wherein the neck wall is polypropylene and wherein the housing wall is polypropylene and has a thickness of about half of the neck wall thickness.

18. The filter system of claim 12, wherein the housing wall has a thickness adapted to withstand a pressure inside the housing wall of no more than 10 psi greater than outside the housing wall.

19. The filter system of claim 12, wherein said neck wall comprises a sealing member for sealing to a fluid passage of a filter head, and said tube member comprises a sealing member for sealing to a fluid passage of the filter head, and wherein the filter cartridge comprises no means for liquid-sealing the filter cartridge to a filter head other than said sealing member of the neck wall and said sealing member of the tube member.

20. The filter system of claim 12, wherein said pressure vessel does not fluid-seal to the filter cartridge and does not fluid-seal to the filter head.

21. A liquid filter assembly for connection to a filter head, the assembly comprising a pressure vessel adapted to mechanically connect to the filter head, and a filter cartridge removably received in the pressure vessel, the filter cartridge comprising a cartridge housing having a bottom wall and an axial sidewall covered by the pressure vessel, and a top end having a radial wall and a neck having a lower end located generally centrally on the radial wall, wherein the neck upends axially from the radial wall and has both liquid inlet and outlet passages adapted to seal to the filter head for liquid communication with the filter head; and wherein the pressure vessel has a radial portion extending radially across said radial wall of the filter cartridge to said lower end of the neck, so that said pressure vessel reinforces the entirety of the cartridge housing except the neck.

22. A filter assembly as in claim 21, wherein said pressure vessel radial portion comprises no liquid-seal to the filter head and no liquid-seal to the filter cartridge.

23. A filter assembly as in claim 21, wherein said radial portion of the pressure vessel has a circular top aperture through which the neck upends for connection to the filter head.

24. A filter assembly as in claim 21, wherein said pressure vessel comprises a pressure body that extends across said bottom wall and up along said axial sidewall, and a removable pressure cap that connects to the pressure body and comprises said radial portion that extends across and covers the entirety of said radial wall of the top end of the cartridge housing.

25. A filter assembly as in claim 24, wherein the pressure cap is the portion of the pressure vessel adapted for mechanical connection to the filter head.

26. A filter assembly as in claim 24, wherein the pressure cap connects to the pressure body by a threaded connection.

27. A filter assembly as in claim 24, wherein said filter cartridge comprises a cartridge body and a cartridge cap detachably connected to each other by a latch mechanism, wherein said cartridge body comprises said bottom wall and said axial sidewall, and wherein said cartridge cap comprises said radial wall and said neck.

28. A filter assembly as in claim 12, wherein said pressure cap is removable from the pressure body to allow removal of the filter cartridge from the pressure vessel, and the cartridge cap is removable from the cartridge body by said latch mechanism to allow access to filter media contained within the cartridge housing.

29. A filter assembly as in claim 28, wherein said latch mechanism comprises a plurality of tabs on said cartridge cap and corresponding slots in said cartridge body that receive said tabs.

30. A filter assembly as in claim 28, wherein said latch mechanism comprises tabs on an outer wall of the cartridge cap extending into slots in the cartridge body, and the cartridge housing is openable by the tabs being cut off of the cartridge cap outer wall.

31. A filter assembly as in claim 21, wherein the cartridge housing is plastic and has a wall thickness in a range of 0.05–0.07 inches, and wherein the neck has an outer wall that is plastic and has a neck wall thickness greater or equal to 0.125 inches, so that the only pressure-bearing portion of the cartridge housing is the neck and the total amount of plastic in the cartridge housing is minimized for improved recycling.

32. A filter assembly as in claim 21, wherein the entire cartridge housing, except for said neck, has a wall thickness that can withstand without rupturing an internal pressure of no greater than 10 psi higher than atmospheric pressure, so that the only pressure-bearing portion of the cartridge housing is the neck and the total amount of plastic in the cartridge housing is minimized for improved recycling.

33. A filter assembly as in claim 21, wherein the neck has an outer wall with a thickness, and said bottom wall, axial sidewall, and said top end radial wall have wall thicknesses less than half the neck outer wall thickness, so that the only pressure-bearing portion of the cartridge housing is the neck and the total amount of plastic in the cartridge housing is minimized for improved recycling.

34. A filter assembly as in claim 21, wherein the entire cartridge housing, except for said neck, has a wall thickness that is adapted to be non-pressure bearing.

* * * * *